United States Patent [19]
Magorien et al.

[11] 3,726,063
[45] Apr. 10, 1973

[54] SYSTEM FOR FLUID DECONTAMINATION

[75] Inventors: Vincent G. Magorien, Granada Hills; John A. Huffman, Northridge, both of Calif.

[73] Assignee: Seaton-Wilson Incorporated, Burbank, Calif.

[22] Filed: Jan. 28, 1971

[21] Appl. No.: 110,477

[52] U.S. Cl. ...................................55/194, 208/186
[51] Int. Cl. ..............................................B01d 19/00
[58] Field of Search..................55/41, 43, 189, 190, 55/192, 194; 208/186

[56] References Cited

UNITED STATES PATENTS

| | | | |
|---|---|---|---|
| 3,357,161 | 12/1967 | Starr et al. | 55/189 |
| 3,538,682 | 11/1970 | Chattin et al. | 55/189 X |
| 2,797,767 | 7/1957 | Brooke et al. | 55/194 X |
| 2,990,030 | 6/1961 | McCoy et al. | 55/194 X |
| 3,358,424 | 12/1967 | Magorien | 55/189 X |
| 1,836,338 | 12/1931 | Rodman et al. | 55/194 X |

Primary Examiner—Samih N. Zaharna
Assistant Examiner—R. W. Burks
Attorney—Fulwider, Patton, Rieber, Lee & Utecht

[57] ABSTRACT

A system for removing contaminants such as dissolved and entrained gas, water and solids from fluids. Contaminated fluid is atomized and filmed in a very low pressure vacuum to remove gas and water. Filters are provided for removal of solids. Decontaminated fluid may be transferred within the system and withdrawn from the system without recontamination.

12 Claims, 1 Drawing Figure

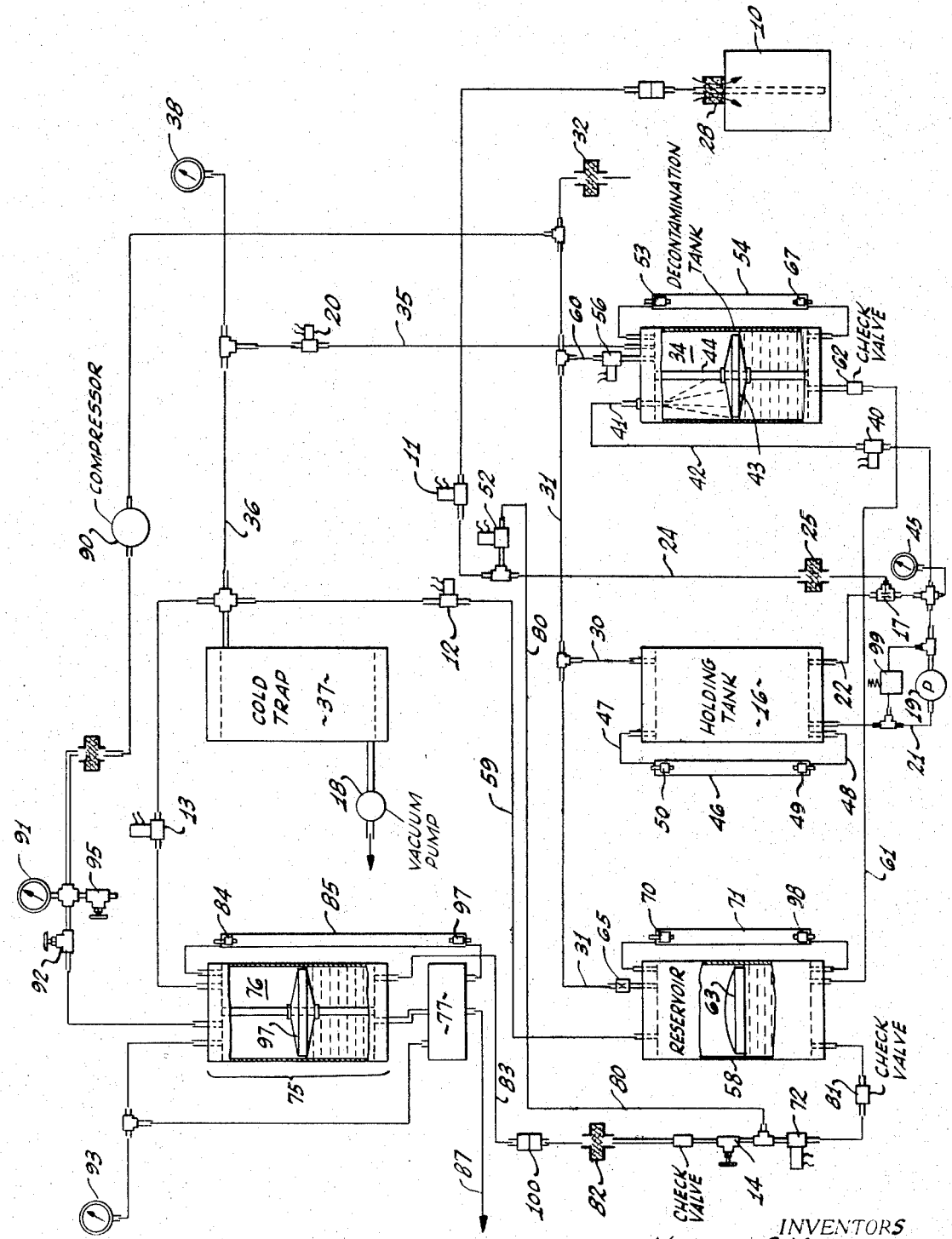

3,726,063

SYSTEM FOR FLUID DECONTAMINATION

BACKGROUND OF THE INVENTION

1. Field of the Invention

This invention relates to devices for separating gases from liquids and, more particularly, to a vacuum system in which the contaminated liquid is atomized and filmed for decontamination. Further, the invention includes a new and improved apparatus for transferring the liquid, both before and after treatment, to insure that the treated liquid is not recontaminated by exposure to gases and air.

2. State of the Prior Art

In many types of systems, fluids are used in such a way that it is of the utmost importance to keep them free from contaminants of all kinds. Three types of contaminants, gas, water and solids, may act to so change the important properties of liquids as to render them unsuitable for their intended use.

For example, fluids are used as the power transmitting means in hydraulic systems. For such a system to work as intended, the fluid must be free of all contaminants. It may be readily appreciated that solid particles in a hydraulic system would erode parts, cause binding of moving parts, and so forth. Also well understood is the undesirable effects of pockets of free gas, such as air, within a hydraulic system. However, less well understood are the effects of dissolved gas in hydraulic fluids.

Gas can become dissolved in fluids such as the various petroleum derivatives utilized in hydraulic systems. Molecules of gas, in dissolving, become distributed throughout the fluid, interspersed among the much larger liquid molecules. When dissolved, the gas does not behave according to Boyle's law. It does not affect the bulk modulus of the solvent fluid. Accordingly, if the air were to remain dissolved, no problems would be created within a hydraulic system.

Dissolved gas, however, does obey Henry's law: the quantity of gas dissolved in a liquid is directly proportional to the partial pressure of the gas. Therefore, as the pressures within the hydraulic system change, the gas may go out of solution and become entrained. Thereafter, the gas acts as in any hydraulic system containing free gas: hydraulic fluid is caused to foam, power is lost, control is spongy, the bulk modulus of the fluid is lowered, and so forth. Because the gas is held in solution, however, the usual practice of bleeding the contaminated hydraulic system does not work. Also, bleeding may not even remove entrained gas where the gas is contained in small bubbles distributed throughout the fluid.

Similar problems are encountered when fluids are used as dielectrics in various electrical components. Industrial power transformers, for example, utilize fluids as both a dielectric and a cooling medium. Very small amounts of solids and water within a dielectric fluid can easily halve its breakdown voltage. Similarly, experimental data indicates that dissolved or entrained gas may reduce the breakdown voltage of a dielectric fluid as much as 40 percent. It is, therefore, of the utmost importance to remove water and dissolved gases from dielectric fluids.

Various types of devices have been utilized in the prior art to remove contaminants from fluids. Filters, for example, can readily remove solids. It is also known to remove dissolved and entrained gas by subjecting the contaminated fluid to a vacuum. As predicted by Henry's law, a decrease of pressure above the fluid results in the dissolved gas passing from solution. Unfortunately, however, creation of a vacuum above a fluid generally results in a great amount of foaming. Quite often, the amount of sudsing renders large amounts of the fluid unuseable. In addition, foam will generally foul the source of vacuum used. Finally, since gas can only be drawn off after foam has collapsed, foaming causes a substantial increase in process time.

SUMMARY OF THE INVENTION

In accordance with this invention, provision is made for the decontamination of fluids. Solids are removed by the system in appropriately placed filters. The fluid is then atomized inside a container in which a vacuum has been created. Dissolved gas is passed out of solution immediately when the vacuum is encountered. Atomization serves to break the fluid into droplets of such small size that the previously dissolved gas escapes from the fluid without the creation of foam and suds. Additionally, the atomized fluid collects and films on surfaces where it is further degassed.

Provision is also made for transfer of the fluid into and out of the decontamination system without the use of means which would serve to recontaminate or further contaminate the fluid. Transfer is accomplished by creating a lower pressure in the destination container than in the source container. In this way, contact of the fluid with contaminating gas or air is held to a minimum.

Further, for those instances where fluid will be retained in the system for a long period of time, the invention provides for recirculation of the purified fluid through the decontamination stages to remove any air that may have passed into solution during the storage time.

DESCRIPTION OF THE DRAWINGS

The FIGURE illustrates the interrelationships of the various components of this invention.

DETAILED DESCRIPTION OF THE INVENTION

In accordance with this invention, fluid is pumped from a storage or shipping container by a vacuum line connected to an aspirator. The latter is a well known device in which a venturi is placed in a pumped fluid stream to create a partial vacuum. As the fluid drawn into the system by the aspirator enters the holding tank, a vacuum is created in the decontaminating tank by a vacuum pump.

When the vacuum reaches a predetermined value, the fluid is pumped from the holding tank to the decontaminating tank through an atomizer. As the atomized fluid enters the tank, dissolved gas is released from solution and drawn off by the vacuum line. At the same time, dissolved water is vaporized and drawn off since the decontaminating tank is at a pressure much lower than the vapor pressure of water at the system temperature.

As the decontaminated fluid collects in the decontamination tank, its level rises. When a maximum level is reached, the fluid input is turned off and the decontaminated fluid drawn to a storage reservoir where it is held until needed. No fluid pump is used in the transfer for considerations of simplicity and reliability.

Decontaminated fluid may be drawn from the reservoir for use or recirculated to the decontamination tank. The latter procedure is utilized when the fluid has been stored for an extended length of time or if additional decontamination is desired. If drawn for use, the fluid is again transferred by vacuum levels so that contact with air is minimized.

This invention removes contaminants to an amount heretofore not reached in the art. For example, this invention has been used to remove dissolved air from saturated Coolanol silicate ester dielectric fluid. Prior to decontamination, the fluid contained about 170 parts per million by weight of air. After decontamination by the apparatus of this invention, the dissolved air content was measured at 4 parts per million by weight. Measurements in each case were taken by the apparatus of U.S. Pat. No. 3,521,478.

Referring to the FIGURE, the decontamination system is illustrated connected to a shipping or storage container 10. The various fluid, vent and vacuum lines are shown controlled by solenoid valves, such as 11, 12 and 13, and manual valves, such as 14. All such valves, which may, of course, take different forms, are initially closed.

Before the system is turned on, it is necessary that a small amount of fluid be introduced into holding tank 16. This fluid is pumped through aspirator 17 in a closed loop to create the vacuum necessary to draw fluid from container 10.

When the system is turned on, vacuum pump 18, hydraulic pump 19 and valves 11, 20 are turned on. The residue of fluid is pumped from holding tank 16 via line 21 and aspirator 17 and returned via line 22. The less-than-atmospheric pressure induced in line 24 by the aspirator immediately begins to draw fluid from container 10 through filter 25. In the preferred embodiment, filter 25 is a depth-type filter.

As fluid is withdrawn from container 10, gas is drawn into the container through desiccant connector 28. The purpose of the desiccant connector, of course, is to ensure that no water vapor enters container 10 to be dissolved in the fluid.

Holding tank 16 is connected to the atmosphere via vent lines 30, 31 and filter 32. As it is being filled by fluid drawn from container 10, vacuum pump 18 is creating a vacuum within decontamination tank 34.

Pump 18 is connected to decontamination tank 34 by vacuum lines 35, 36 and cold trap 37. The trap is a standard device in high vacuum systems used to protect pump 18 from vapors in any of the vacuum lines. Liquid nitrogen is placed in the trap to condense any such vapor drawn in from any of the various lines.

When the vacuum in decontamination tank 34 reaches a low level, about 500 microns of mercury in the preferred embodiment, as measured by gauge 34, valve 40 is opened. Some of the fluid from pump 19 is then connected to atomizer 41 via line 42.

Atomizer 41 is a most important element of this invention. It is used to reduce the fluid to droplets of sufficiently small size so that the dissolved and entrained gas is drawn off via vacuum line 35 without the formation of foam or suds. It is believed by the inventors that maximum droplet sizes of approximately 0.010 inch in diameter are necessary for foaming not to take place. At any rate, it has been found that satisfactory decontamination occurs without foaming with about 150 p.s.i.g., as measured by gauge 45, pressure in line 42 and an equilibrium pressure of about 700 microns of mercury in decontamination tank 34. Atomizer 41, in the preferred embodiment, is a Type 1/4 M6 — Brass nozzle, manufactured by Spraying Systems Co., Bellwood, Illinois.

As the decontaminated fluid collects within decontamination tank 34, float 43 rises on column 44. The main purpose of float 43 is to protect the upper surface of the collected fluid from contamination during the transfer cycle as air is introduced for transfer. Accordingly, the float is sized as closely as possible to the inside diameter of the decontamination tank. In addition, the sloping upper surface of the float, along with the interior walls of the tank, serve to film the collecting fluid. This removes any dissolved or entrained gas which may remain after atomization. Further, the lower surface of the float is shaped like an inverted cove so that no contaminants will be trapped beneath the float.

The flow rates, in the preferred embodiment, are adjusted so that slightly more fluid is drawn in from container 10 than is pumped to decontamination tank 34 via line 42. Accordingly, the fluid level in holding tank 16 generally rises slowly even after valve 40 opens.

Holding tank 16 includes level tube 46 connected to the tank via lines 48, 48. At the top of level tube 46 is switch 50, which operates when the fluid level reaches its level. Switch 49 operates when the fluid level falls to that point.

The sequence described above continues until the fluid level in holding tank 16 reaches switch 50. This causes valve 11 to be turned off, stopping the withdrawal of fluid from container 10. Valve 52, which would be on during the recirculate mode, is turned off if the system had been in that mode. The recirculate mode will be explained in detail below.

After valve 11 closes, fluid is pumped into decontamination tank 34 until that stage fills, as detected by switch 53 in level tube 54. Valve 11 will be reopened when the fluid level drops below switch 50. When the fluid level in the holding tank reaches switch 49, as would happen if container 10 becomes empty, valve 40 closes to maintain a supply of fluid for pump 19 to recirculate. Without this initial amount of fluid, pump 19 would be damaged and aspirator 17 would not operate.

When decontamination tank 34 is filled, the fact is indicated by the closure of switch 53 in level tube 54. This causes valves 40 and 20 to close, shutting off the fluid supplied to atomizer 41 and the vacuum source from tank 34. At the same time, valves 12 and 56 open, connecting the vacuum source to reservoir 58 via line 59 and venting decontamination tank 34 to the atmosphere via line 60.

Reservoir 58 is a closed container connected to decontamination tank 34 via line 61 and check valve 62. The reservoir contains a free-floating float 63. As before, the purpose of float 63 is to protect the upper surface of the decontaminated fluid from the air in the upper portion of the reservoir during fluid transfer. Accordingly, float 63 is made as nearly as possible the same dimension as the inside diameter of reservoir 58.

In addition to being connected to the source of vacuum via line 59, reservoir 58 is also connected to the atmosphere via line 31 and constriction 65. The pressure, then, in reservoir 58 is held at a range of values between that of the vacuum source and the atmosphere. Decontamination tank 34 is vented to the atmosphere and is, therefore, at a higher pressure than reservoir 58. Fluid is thereby drawn from decontamination tank 34 to reservoir 58 via line 61.

Reservoir 58 is preferably sized larger than decontamination tank 34 so that it can receive several cycles from the decontamination tank before filling. When the decontamination tank empties, switch 67 reverses the controls of switch 53, thereby closing valve 56, opening valve 20 and closing valve 12. Valve 40 will be opened when the vacuum level within main stage 34 reaches approximately 500 microns of mercury. Thereafter, the process repeats as described above.

The sequence described continues until reservoir 58 is filled. Switch 70 in level tube 71 senses that the reservoir is filled and closes valve 11 and opens valve 52 placing the system in the recirculate mode. Valve 72 is held on as long as fluid covers switch 98. The system now operates as described above, except that the source of fluid is now reservoir 58 via line 80 rather than container 10. This sequence continues until stopped by a master switch. While a single cycle has been found sufficient for decontaminating to a level suitable for nearly all applications, further cycles will remove dissolved gas to even lower levels. In addition, the system may be placed in the recirculate mode if the reservoir has remained filled for an extended period of time.

Many different methods may be utilized to withdraw fluid from reservoir 58 for use. Obviously, fluid must be withdrawn in such a fashion so as not to be recontaminated. For example, connector 100 may be simply sealed to the device to be filled after which the device is evacuated. The pressure difference between the device and reservoir 58 may then be used to cause the decontaminated fluid to be transferred to the device.

Another method is illustrated in the FIGURE. In the filling method indicated, only one opening to the device to be filled is available.

Via line 87, the device to be filled is evacuated by vacuum pump 18. Trickle fill line 87 is sealed to the device and fluid allowed to trickle in. This is necessary so that whatever air is left can rise through line 87 as the fluid descends.

Trickle fill chamber 75 consists of two portions 76, 77. Generally, portions 76 and 77 are sized to contain enough fluid to completely fill the device being filled. To fill chamber 75, valve 13 is first opened to create a vacuum within the chamber. Valve 14 is then opened, causing fluid to be transferred from reservoir 58 to chamber 75 via check valve 81, filter 82 and line 83. This continues until the chamber is filled, as sensed by switch 84 in level tube 85. Valves 13 and 14 are then closed.

In those instances where the device must be filled to a predetermined pressure, compressor 90 is switched on after the device is filled. Valve 95 is adjusted to obtain the desired pressure on gauge 91. When gauge 91 registers the desired pressure, valve 92 is opened allowing chamber 75 to also reach the desired filling pressure. The device being filled is then disconnected.

Compressor 90 is then turned off and the pressure in chamber 75 reduces through vent valve 95. Valve 92 is then closed.

It is noted that upper portion 76 of chamber 75 is provided with a float construction 97 like that in main chamber 34. Notwithstanding float 97, some contamination of the outer portions of the fluid in chamber 75 takes place, especially when the chamber is connected to the higher pressure produced by compressor 90. Accordingly, it is generally advisable to completely purge the fluid in chamber 75 remaining after each filling. The purged fluid may then be recycled to remove the dissolved air.

Lower switches 97, 98 in level tubes 85, 71 may be used as safety devices to signal the fact of the respective containers having been emptied. Similarly, hydraulic pump 19 is provided with the usual safety valve 99 to protect the motor.

We claim:

1. In a system for decontaminating fluid, the combination comprising
   a source of contaminated fluid,
   means for withdrawing fluid from said source and raising the withdrawn fluid to an elevated pressure,
   closed container means,
   means for selectively evacuating said closed container means to create a partial vacuum therein,
   means connected to receive said fluid at an elevated pressure for atomizing said fluid within said closed container means,
   means connected to said closed container means for storing the fluid that forms after said atomization,
   means for selectively adjusting the pressure in said closed container means and said storing means for causing a flow of said fluid to said storing means, and,
   first and second float means within said closed container means and said storing means for floating on and substantially covering the surface of contained fluid.

2. The fluid decontamination system of claim 1, wherein said means for atomizing is a nozzle which produces fluid droplets having a maximum diameter of 0.01 inch.

3. In a system for decontaminating fluid, the combination comprising
   a source of contaminated fluid,
   first closed container means,
   means for transferring fluid from said source to said first closed container means,
   means for withdrawing fluid from said first closed container means and raising the withdrawn fluid to an elevated pressure,
   second closed container means,
   means for selectively evacuating said second closed container means to create a partial vacuum therein,
   means connected to receive said fluid at an elevated pressure for atomizing said fluid and injecting the atomized fluid into said second closed container means,
   means connected to said second closed container means for storing the fluid that forms after said atomization, means for selectively adjusting the pressure in said second closed container means and said storing means for causing a flow of said fluid to said storing means, and, first and second float means within said second closed container means and said storing means for floating on the surface of and substantially covering contained fluid.

4. The fluid decontamination system of claim 3, wherein said means for atomizing produces fluid droplets having a maximum diameter of 0.01 inch.

5. In a system for decontaminating fluid, the combination comprising
a source of contaminated fluid,
a first closed container means,
a second closed container means,
means for moving contaminated fluid from said source to said first container means and from said first container means to said second container means,
means connected to receive said fluid from said first container means for atomizing said fluid and injecting it into said second container means,
means for selectively evacuating said second container means to create a partial vacuum therein,
a third closed container means,
means for selectively adjusting the pressure in said second and third closed container means for causing a flow of said fluid to said third container means, and,
float means within said second and third closed container means for floating on the surface of the contained fluid.

6. The fluid decontamination system of claim 5, wherein said means for atomizing produces fluid droplets having a maximum diameter of 0.01 inch.

7. The fluid decontamination system of claim 5, further comprising
a fourth closed container means, consisting of first and second chambers,
means for selectively adjusting the pressure in said third and fourth container means for causing a flow of liquid from said third container means to said fourth container means, and,
means for connecting said second chamber to a device being filled with said fluid.

8. The fluid decontamination system of claim 7, further comprising means for selectively raising the pressure in said fourth container means.

9. In a system for decontaminating fluid, the combination comprising
a first closed container means,
means connected to receive fluid to be decontaminated for atomizing said fluid within said first closed container means,
a second closed container means,
means for selectively adjusting the pressure between said first and second closed container means for causing a flow of fluid from said first closed container means to said second closed container means, and,
float means within said second closed container means for floating upon and substantially covering the surface of contained fluid.

10. The system for decontaminating fluid of claim 9, further comprising second float means within said first closed container for floating upon and substantially covering the surface of contained fluid.

11. The system for decontaminating fluid of claim 9, further comprising means for selectively evacuating said first closed container means to create a partial vacuum therein.

12. The system for decontaminating fluid of claim 9, further comprising
second float means within said first closed container for floating upon and substantially covering the surface of contained fluid, and,
means for selectively evacuating said first closed container means to create a partial vacuum therein.

* * * * *